(12) United States Patent
Zaghloul et al.

(10) Patent No.: US 7,866,259 B2
(45) Date of Patent: Jan. 11, 2011

(54) CENTRIFUGAL FOOD DEGREASER

(75) Inventors: Hatim Zaghloul, Calgary (CA); Mohammed Mali, Calgary (CA); Hussein Desouki, Calgary (CA); Sisso El-Hamamsy, Calgary (CA)

(73) Assignee: Innovative Products for Life Inc., Calgary (CA)

( * ) Notice: Subject to any disclaimer, the term of this patent is extended or adjusted under 35 U.S.C. 154(b) by 1275 days.

(21) Appl. No.: 11/306,987

(22) Filed: Jan. 18, 2006

(65) Prior Publication Data

US 2007/0163450 A1    Jul. 19, 2007

(51) Int. Cl.
A47J 43/00 (2006.01)

(52) U.S. Cl. ............... 99/495; 99/511; 210/360.1; 210/380.1; 494/36; 494/44; 494/56

(58) Field of Classification Search ........... 99/510–513, 99/403–418, 495, 352–355; 210/360.1, 380.1; 494/36, 43, 56–60, 83, 84; 134/157–162; 366/228, 279
See application file for complete search history.

(56) References Cited

U.S. PATENT DOCUMENTS

| | | | | |
|---|---|---|---|---|
| 2,302,138 | A * | 11/1942 | Nicholson | 99/512 |
| 3,200,737 | A * | 8/1965 | Ferenc | 99/355 |
| 4,114,286 | A | 9/1978 | Bingham | |
| 4,189,850 | A * | 2/1980 | Dieterich et al. | 34/58 |
| 4,194,697 | A * | 3/1980 | Lembeck | 241/92 |
| 4,273,033 | A * | 6/1981 | Hice | 99/349 |
| 4,517,082 | A * | 5/1985 | Prudhomme | 210/117 |
| 4,591,434 | A * | 5/1986 | Prudhomme | 210/117 |
| 4,702,162 | A * | 10/1987 | Sontheimer et al. | 99/495 |
| 4,873,820 | A * | 10/1989 | Martorell | 56/340.1 |
| 5,010,805 | A | 4/1991 | Ferrara | |
| 5,027,697 | A * | 7/1991 | De Longhi | 99/409 |
| 5,176,825 | A * | 1/1993 | Hadjis et al. | 210/259 |
| 5,223,137 | A * | 6/1993 | Hattori et al. | 210/368 |
| 5,230,281 | A * | 7/1993 | Wireman et al. | 99/483 |
| 5,317,964 | A | 6/1994 | Prudhomme | |
| 5,417,152 | A * | 5/1995 | Harrison | 99/492 |
| 5,490,453 | A | 2/1996 | Mackay | |
| 5,749,285 | A * | 5/1998 | Dorner et al. | 99/348 |
| 6,135,019 | A | 10/2000 | Chou | |
| 6,192,068 | B1 * | 2/2001 | Fattouche et al. | 375/130 |
| 6,412,401 | B1 | 7/2002 | Mariotti | |
| 7,222,567 | B2 * | 5/2007 | Schrader et al. | 100/213 |

* cited by examiner

Primary Examiner—Mark H Paschall
(74) Attorney, Agent, or Firm—Law Office of Marc D. Machtinger, Ltd.

(57) ABSTRACT

An apparatus for use with a food processor base and a method for using the same. The food processor base includes a seat, a drive shaft and a motor. The drive shaft is rotated by the motor. The apparatus includes an outer bowl, a cover for the outer bowl, and a perforated inner bowl. The outer bowl may include a connector for being seated on the seat of the food processor base. The inner bowl is positioned within the outer bowl and is connectable to the drive shaft of the food processor base for rotation of the inner perforated bowl within the outer bowl. The inner perforated bowl has a one to one rotation with the drive shaft.

22 Claims, 7 Drawing Sheets

CENTRIFUGAL FOOD DEGREASER

BACKGROUND OF THE INVENTION

It is well known that eating foods with less oil and grease will reduce fat and caloric intakes. U.S. Pat. No. 5,490,453 to Mackay discloses an appliance provided with a spinning rotatable basket within an outer drum to centrifugally extract fat from foods. Mackay uses a self centering central chamber to reduce vibrations. In other devices that are attachments for existing blenders, gears are used to reduce the speed, and wheels are used to support the inner basket. The devices described in the prior art are more complicated than is necessary. What is needed is a simplified, more economical apparatus for removing oil from foods.

SUMMARY OF THE INVENTION

According to an aspect of the invention, there is provided an apparatus for use with a food processor base, and a method of using it to remove oil from food. The food processor base includes a seat, a drive shaft and a motor, where the drive shaft is rotated by the motor. The apparatus comprises an outer bowl, the outer bowl being removably seated on the seat of the food processor base, and a perforated inner bowl within the outer bowl. The inner bowl is connectable to the drive shaft of the food processor base for rotation of the inner bowl within the outer bowl, the inner bowl having a one to one rotation with the drive shaft.

The inner bowl may comprise an insert extending from the bottom of the inner bowl, and the outer bowl may comprise an insert receptacle for receiving the insert. A cover may be provided for the outer bowl. A cover may be provided for the inner bowl. A lip may be introduced on the outer bowl to introduce some friction and centering for the inner bowl and to prevent the oil from spilling out of the outer bowl. A shaft extension may be included to connect the drive shaft and the inner bowl, the shaft extension being attached to the inner perforated bowl. The outer bowl may comprise a drain for draining fluid within the outer bowl, and a filter for filtering the fluid to be drained. Vibration dampeners, such as rubber suction cups, may be positioned between the food processor base and a work surface. A connector separable from the outer bowl for connecting the outer bowl to the seat of the food processor base may be provided.

According to a further aspect of the invention there is provided a kit containing the apparatus and one or more connectors sized to fit different sized seats of food processor bases.

Other aspects of the invention will be apparent from a reading of the description and the claims, which are incorporated here by reference.

BRIEF DESCRIPTION OF THE DRAWINGS

There will now be described preferred embodiments of the invention, for the purpose of illustration only, by reference to the drawings, in which.

DETAILED DESCRIPTION OF PREFERRED EMBODIMENTS

In the claims, the word "comprising" is used in its inclusive sense and does not exclude other elements being present. The term "food processor" refers to any small appliance that includes a base, a motor, and a drive shaft for rotating a body, such as a blade attachment or a bowl. The term "drive shaft" refers to the totality of the mechanism moved by the motor and used to rotate a body, such as a blade attachment or a bowl, and includes a shaft extension for connecting the drive shaft to the rotating body. The drive shaft is not limited to the type of drive shaft emanating from a base, but may include a drive designed to receive a shaft extension inserted into the base and rotated by the motor, for example, by fitting the shaft extension ending in a gear into another gear or series of gears within a drive located within the base.

Figure 1:
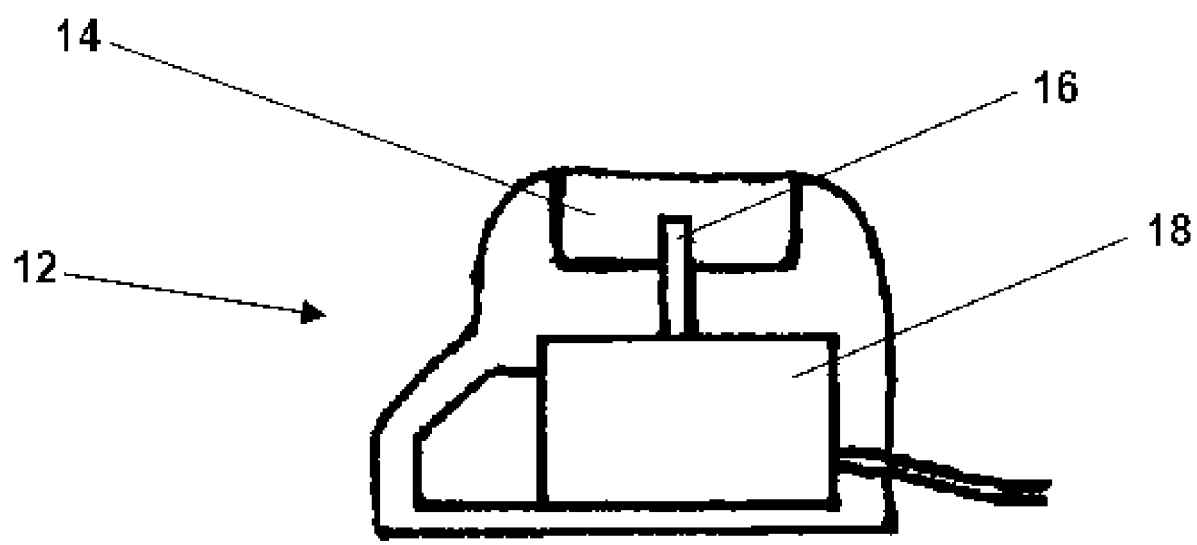
FIG. 1 is a sectional view of a conventional food processor base.

Shown in FIG. 1 is a conventional food processor base 12 that includes a seat 14 and a drive shaft 16 that is rotated by an electric motor 18, such as a 400 W motor. As shown in FIG. 1, the drive shaft 16 may emanate from the base in conventional fashion to be received by a shaft extension. Alternatively, the drive shaft may be designed to receive a shaft extension. If the drive shaft is of this type, the drive shaft may include a drive or drive stem and a shaft extension that together form a drive shaft, and the drive may be located within the base so as not to protrude beyond the bottom of the seat of the base. The shaft extension may fit into the drive in various ways. For example, the shaft extension may end in a gear that fits within a gear or series of gears within the drive. Alternatively, the shaft extension may terminate in a hexagonal shape or other shape that fits within a correspondingly shaped recess within a drive stem. Other forms of connecting a shaft extension to a drive may be used, and are known to those skilled in the art.

Figure 2:
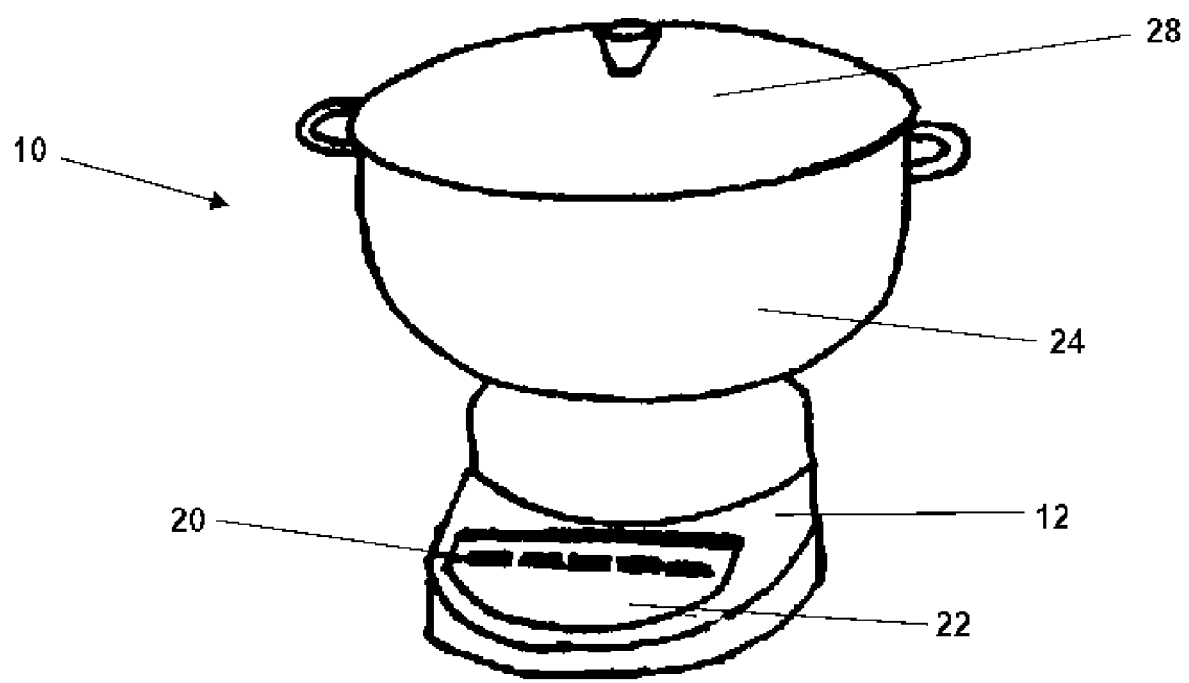
FIG. 2 is a perspective view of a degreaser on a food processor base.

Referring to FIG. 2, there is shown an apparatus 10 for removing oil from food mounted on a food processor base 12. Apparatus 10 is designed to be adapted to food processor bases that are purchased from other vendors allowing apparatus 10 to be sold as an attachment for a food processor base already owned by the purchaser, such as a blender base. The speed is typically controlled by buttons 20 on a panel 22, and may have, for example, five speeds. If base 12 is sold with apparatus 10, it may also be desirable to include other implements, such as traditional food processing attachments and to introduce special speeds, or duty-cycles, for the separation of oil from special foods.

Figure 3:
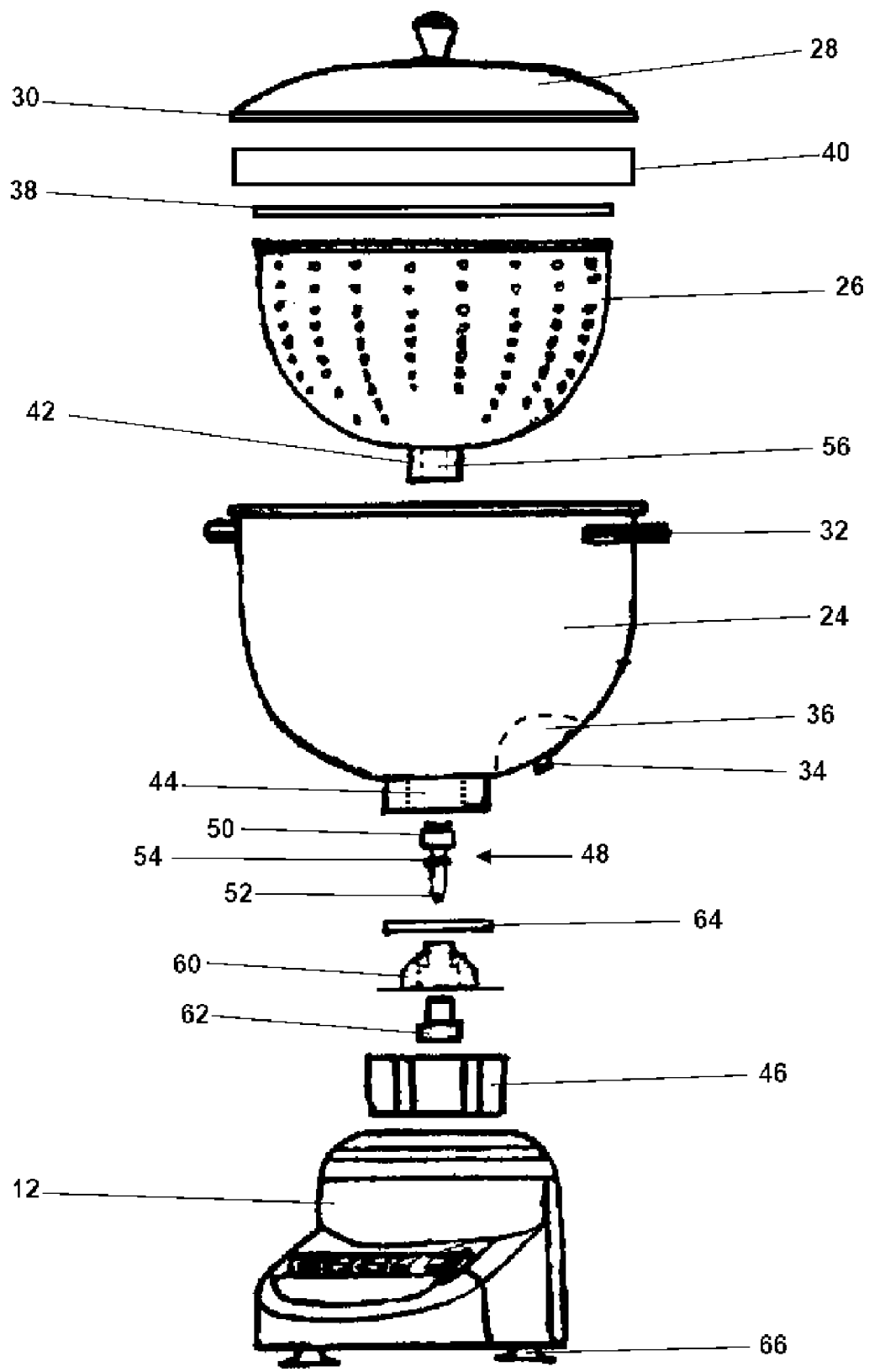
FIG. 3 is an exploded view of the degreaser in FIG. 2.

Referring to FIG. 3, apparatus 10 includes an outer bowl 24 and a perforated inner bowl 26. An outer lid 28 over outer bowl 24 is used to prevent oil extracted from the food within to escape outer bowl 24. Outer lid 28 may include a rubber O-ring 30 positioned on the contact surface between outer lid 28 and outer bowl 24 to provide a better seal against extracted oil. Outer lid 28 may be designed to act as a measuring device. Outer bowl 24 has handles 32, while outer lid 28 typically has a handle, such as a knob attached by a screw, for easy removal of the outer lid 28 from the outer bowl 24. Outer bowl 24 may also comprise a drain 34 for draining collected fluid from within outer bowl 24. A filter 36 may also be provided, either within the outer bowl 24, or outside the outer bowl 24 on the other side of the drain 34. A filter 36 is useful for filtering the fluid being drained so that the fluid, such as oil, may be easily re-used.

An inner lid 38 may fit over inner bowl 26. The inner lid 38 is used to prevent food from escaping the inner bowl 26 and becoming lodged between the inner bowl 26 and the outer bowl 24 when the inner bowl 26 is being rotated. The inner bowl 26 may also have a handle (not shown), such as a bail-type handle, that fits within the inner bowl 26 during use and lifts up when removal of the inner bowl 26 is desired.

Figure 4:
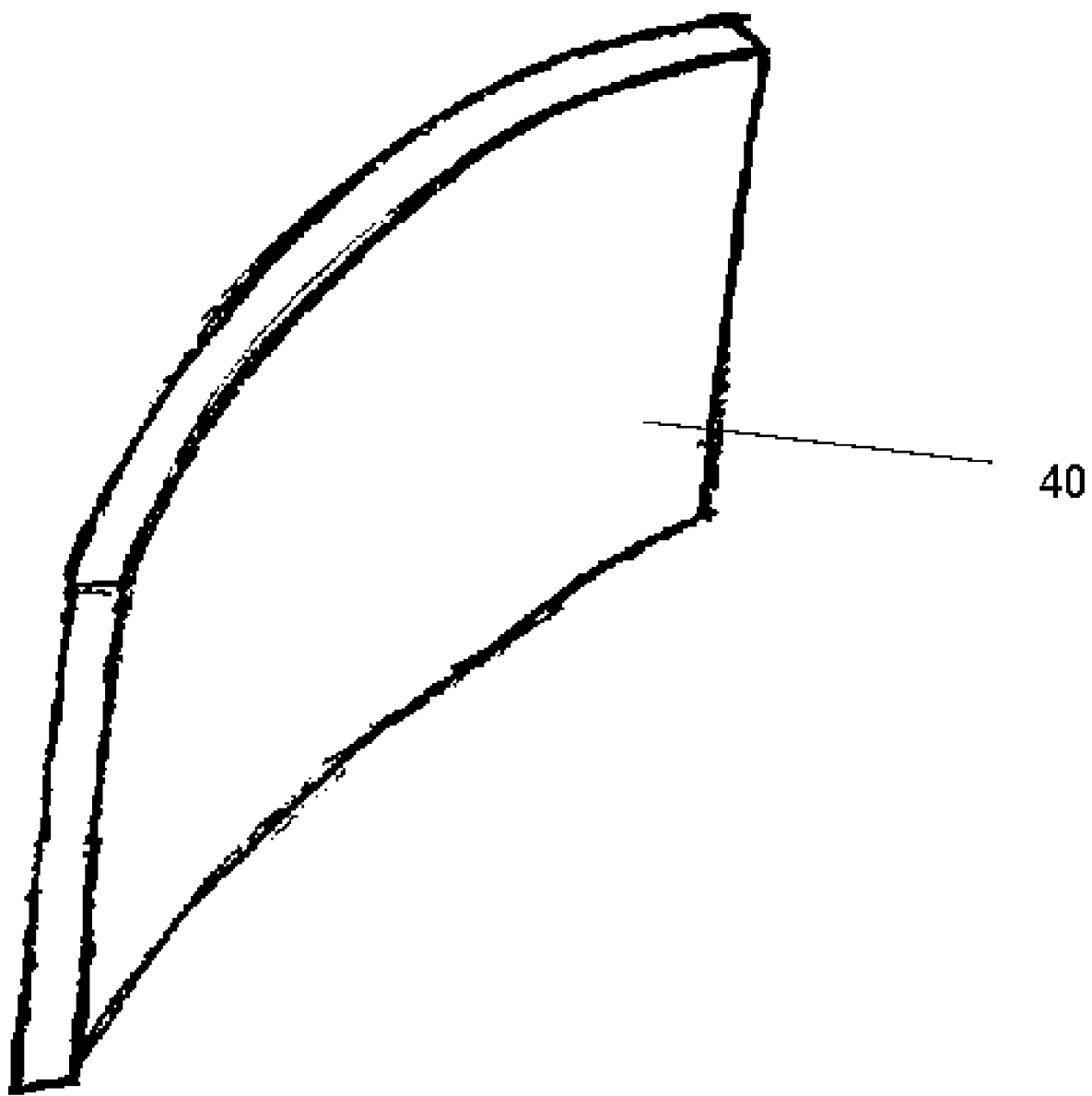
FIG. 4 is a perspective view of a section of a removable lip.
Figure 5:
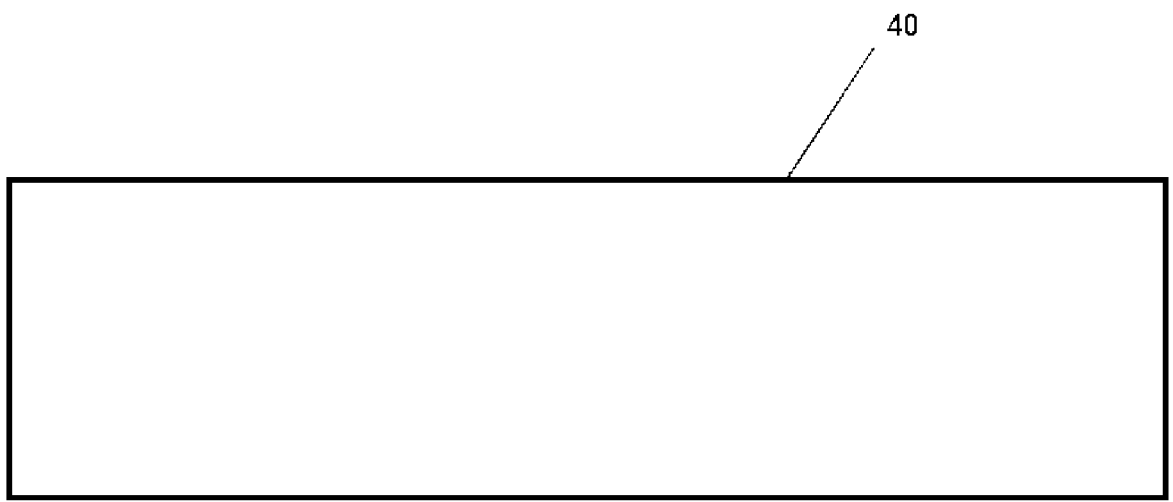
FIG. 5 is a side view of the removable lip of FIG. 4.

Preferably, a removable lip 40 may fit on the outer bowl or on the inner bowl filling the gap between the top of the inner bowl 26 and the walls of the outer bowl 24. If this approach is used, an inner lid may not be required, since the removable lip 40 would serve dual functions, providing friction with the inner bowl 26 to regulate the speed of the motor and preventing food from spilling over the sides of the inner bowl 26 or otherwise becoming lodged between the inner bowl 26 and the outer bowl 24. As shown in FIGS. 4 and 5, the removable lip 40 is preferably rectangular in cross-section, with a height greater than the width of the cross-section of the removable lip 40. The removable lip 40 may be sized to press fit against the walls of the outer bowl 24 or to fit snugly around the top of the inner bowl 26. The removable lip 40 may also fit between the inner lid 38 and the outer lid 28 to introduce friction with the inner lid 38 to regulate the speed of the motor, although this is not preferred.

Inner bowl 26 is smaller than outer bowl 24, and is adapted to fit comfortably within outer bowl 24. The inner bowl 26 may have a stabilizing insert 42. The insert 42 may fit into an insert receptacle 44 in outer bowl 24 for added stability, provided the insert receptacle 44 does not prevent the inner bowl 26 from rotating freely within the outer bowl 24. Outer bowl 24 typically attaches to the food processor base by using a connector 46, such as a removable base, that attaches to the outer bowl 24, for example, by threading onto threads on the bottom of the outer bowl 24. The connector 46 then clips in, slots in, or otherwise locks into place on the seat of the food processor base 12.

Because the apparatus is preferably used on a separately purchased food processor base 12, connector 46 may be similar to bases that are used with conventional blenders or the like. It may be necessary, however, to provide different sizes of connectors 46 that are sized to different seats of existing food processors such as blenders, and a kit may be sold containing one or more adaptors (not shown) that would enable a connector from an existing food processor base to connect to a standard apparatus 10. Alternatively, apparatus 10 may be sold with a connector 46 specific to a particular model or type of food processor, allowing consumers to purchase the appropriate apparatus/connector combination for their needs.

In the embodiment shown in FIG. 3, inner bowl 26 is connected to a drive by a shaft extension 48, and the drive and shaft extension 48 together form the drive shaft. Shaft extension 48 has a top 50 and a bottom 52, and preferably has a V-ring seal 54. Typically, the shaft extension 48 connects securely to inner bowl 26 by inserting the top 50 of the shaft extension 48 into a socket 56 in the insert 42 and fitting the shaft extension bottom 52 into a drive within the base 12. It should be understood that where the apparatus is to be used with a conventional base as shown in FIG. 1, a shaft extension may have a top for fitting into a socket in the inner bowl and have a bottom having a socket for receiving a drive shaft emanating from the base.

Alternatively, the inner bowl 26 may have a protrusion (not shown) extending beyond the insert 42 for fitting into a socket in the top of the shaft extension, and the shaft extension may either have another socket in the bottom of the shaft extension or else fit into a socket or series of gears or otherwise fit into the base. However, having a protrusion extending beyond the insert 42 is not preferred, since it is preferred to have the bottom of the inner bowl as flat as possible for setting on a work surface when the inner bowl 26 is removed from the outer bowl 24.

It should be understood that in a similar fashion to providing adaptors or apparatus/connector combinations specific to various food processor bases, it would also be possible to provide an adaptor (not shown) or shaft extension specific to a particular food processor base and that can be used with a standard apparatus. Likewise, a combination apparatus/connector/shaft extension could be sold specific to a particular model or type of food processor, allowing consumers to purchase the appropriate apparatus/connector/shaft extension combination for their needs.

The inner bowl 26 could have a socket located wholly within the base of the inner bowl, such as by thickening the base of the inner bowl 26 and milling in a socket having a shape, such as a hexagon, for receiving the top of the shaft extension, if even greater stability is desired when setting the inner bowl 26 on a work surface. However, the inner bowl 26 with the insert 42 as shown has proven suitable, and provides added stability when the inner bowl 26 is in use.

In a preferred embodiment, the apparatus 10 may be assembled in the following manner. A fitting 60 having a sleeve 62 is placed into the connector 46. The fitting 60 and the sleeve 62 may be of unitary construction, or the sleeve 62 may insert into the fitting 60. The fitting 60 is typically made out of plastic, but could be made out of any suitable material. The sleeve 62 is typically made out of brass, but could be made of any suitable material. Once the fitting 60 and sleeve 62 are placed into the connector 46, a gasket 64, such as a flat rubber ring, is placed onto the fitting 60. The shaft extension 48 may then be inserted into the sleeve 62 and pass through the sleeve 62 and connector 46 to be received by a drive in the base 12. Alternatively, if the shaft extension is of a type that receives a drive shaft emanating from the base, the shaft extension may be inserted into a sleeve but may not pass all the way through the sleeve and the connector. Preferably, the shaft extension 48 has a V-ring seal 54 that provides additional sealing between the sleeve 62 and the shaft extension 48. The fitting 60, the sleeve 62, and the gasket 64 are held securely in place when the connector 46 is threaded onto outer bowl 24.

It would be possible to make the fitting 60, sleeve 62, and shaft extension 48 of unitary construction, and simply place the combined piece into connector 46, insert gasket 64, and thread or otherwise attach connector 46 to outer bowl 24. If this approach were adopted, it would be necessary to ensure that the shaft extension was still able to rotate freely, since the fitting would be held firmly in place between the connector and the outer bowl pressing against the rubber gasket. The embodiment shown in FIG. 3 is preferred since the shaft extension 48 and the fitting 60 and sleeve 62 can be easily separated for cleaning and are easier to manufacture. It would also be possible to make the fitting 60, sleeve 62, and shaft extension 48 be of unitary construction with the outer bowl 24, in which case the outer bowl 24 and the rotation transfer mechanism defined by the fitting 60, sleeve 62, and shaft extension 48 would be a single piece to attach to the connector 46, with a gasket 64 pressed between the outer bowl 24 combination and the connector 46. It would even be possible to make fitting 60, sleeve 62, shaft extension 48 and outer bowl 24 be of unitary construction with the connector 46, in which case, no gasket 64 would be required, since the combination of the fitting 60, sleeve 62, shaft extension 48, outer bowl 24, and connector 46 would be fluid tight.

It should be understood that in the embodiment shown in FIG. 3, inner bowl 26 attaches to the apparatus 10 primarily by receiving the top 50 of the shaft extension 48 into the socket 56 of the inner bowl, and as such, when the inner bowl 26 stops spinning, the inner bowl 26 may be easily removed by simply lifting out the inner bowl 26 from the outer bowl 24.

This ability to lift the inner bowl 26 out of the outer bowl 24 quickly and easily is advantageous where the apparatus 10 is being used for extended periods of time for multiple batches of food requiring processing. In this way, the outer bowl 24 can remain locked into the base, while the inner bowl 26 can be easily removed and set on a work surface without dismantling the entire apparatus 10, removing the contents of the inner bowl 26 in a time-consuming fashion piece by piece, or lifting the entire apparatus 10 by the handles 30 and attempting to dump out the contents of the inner bowl 20, potentially pouring hot grease just removed from the food back onto the food or onto the person attempting to dump out the food.

As described, inner bowl 26 is able to rotate with respect to outer bowl 24, such that food may be placed within perforated inner bowl 26 which is then rotated to extract the oil or other fluid from the food. The fluid is caught by outer bowl 24 and settles to the bottom of outer bowl 24. Some problems that may occur during this process include oil leaking from apparatus 10, and vibrations that are mainly due to the weight of the food within inner bowl 26 not being evenly distributed.

The collected fluid is prevented from leaking out the top by O-ring 30 on cover 28. Oil is prevented from leaking out the bottom by V-ring seal 54, fitting 60, and gasket 64 placed between fitting 60 and the bottom of outer bowl 24.

To counteract vibrations, precision manufacturing may be employed to reduce vibrations not occurring from an unbalanced load, and vibration dampeners such as rubber suction cups 66 are placed on the bottom of base 12 that attach to a working surface, such as a counter top to reduce the vibrations due to the unbalanced load in inner bowl 26. The rubber acts to absorb some vibrations and the suction prevents base 12 from moving around because of the vibrations.

Figure 6:
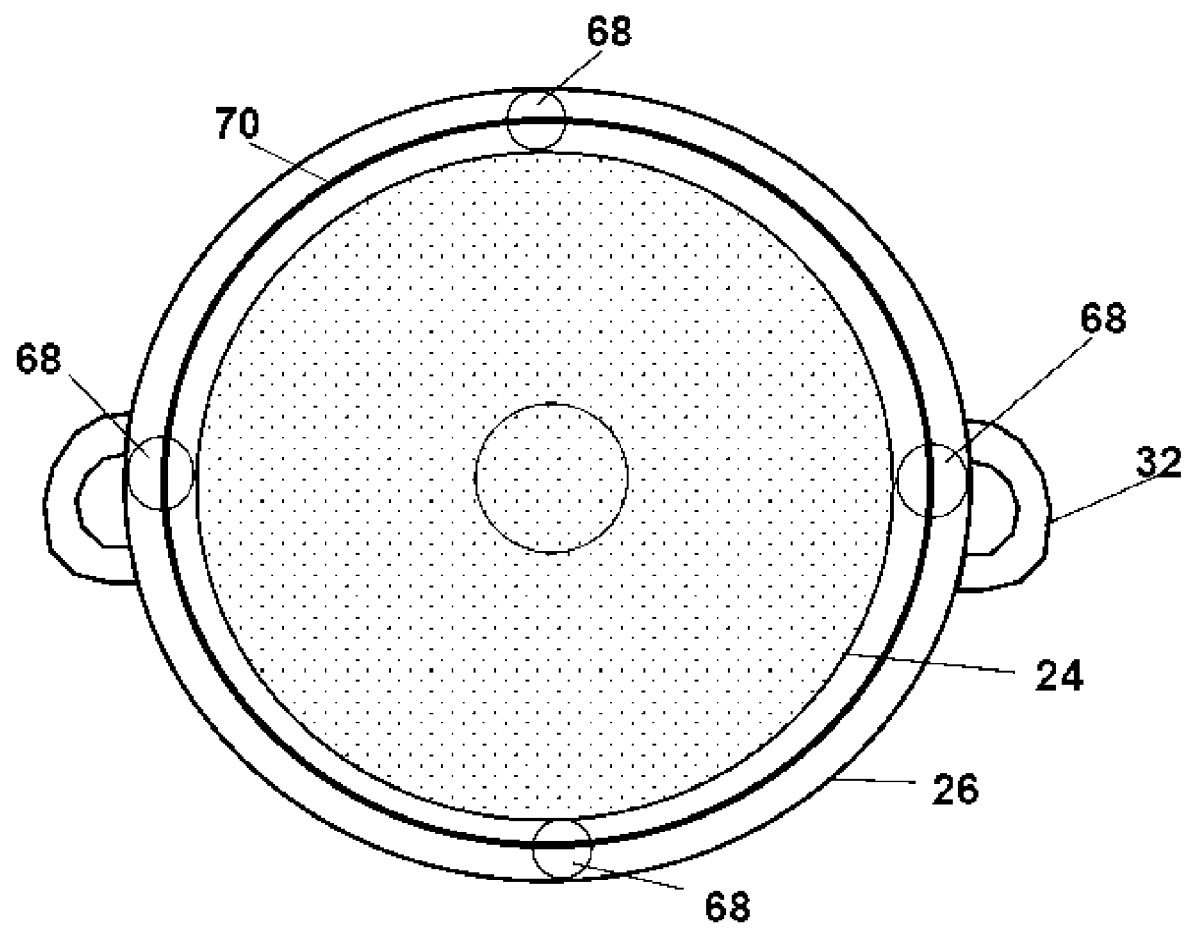
FIG. 6 is a top view of centering wheels attached to a centering ring.
Figure 7:
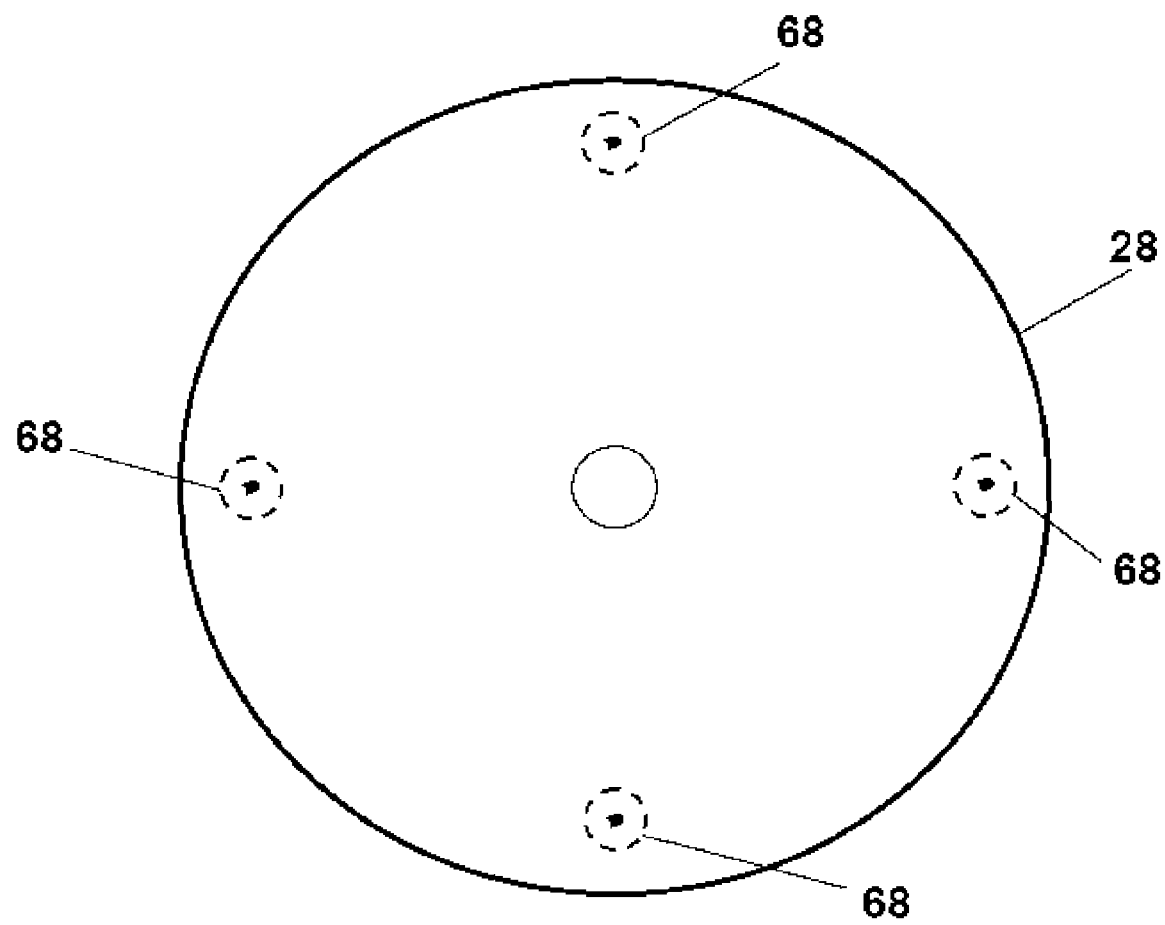
FIG. 7 is a top view of the outer lid with centering wheels attached to the lid.

To further stabilize the inner bowl 26 within the outer bowl 24, there may be centering wheels 68 as shown in FIG. 6 and FIG. 7. In FIG. 6, the centering wheels 68 are attached to a centering ring 70. The centering ring 70 fits between the inner bowl 26 and the outer bowl 24, such that the wheels 68 prevent the inner bowl 26 from moving out of center with the outer bowl 24. Alternatively, as seen in FIG. 7, the centering wheels 68, shown in outline, may be attached to the outer lid 28 in conventional fashion, such as with spindles, screws, or other attachment that permits the centering wheels 68 to rotate while the centering wheels 68 fit between the inner bowl 26 and the outer bowl 24.

While suitable materials will be apparent to those skilled in the art, preferred materials include materials that are dishwasher safe, such as stainless steel or a plastic suitable to hold hot food and grease without being damaged and without leaching harmful substances into the food. In addition, different materials for different components may be present, such as hard plastic for connector 46, brass for sleeve 62, and stainless steel for outer bowl 24, inner bowl 26, outer lid 28, and inner lid 38.

Immaterial modifications may be made to the apparatus described here without departing from the invention.

What is claimed is:

1. An apparatus for use with a food processor base, the food processor base including a seat, a drive shaft and a motor, the drive shaft being connected for rotation by the motor, the apparatus comprising:
   an outer bowl, the outer bowl having a removable base, the removable base being removable from the outer bowl, the removable base being configured to removably slot or clip into the seat of the food processor base and the outer bowl having a lid; and
   a perforated inner bowl mounted for rotation within the outer bowl, the perforated inner bowl having a connector for receiving the drive shaft of the food processor base, the perforated inner bowl being removable from the outer bowl.

2. The apparatus of claim 1 further comprising a speed retarder disposed between the perforated inner bowl and the outer bowl to regulate the speed of the perforated inner bowl.

3. The apparatus of claim 2 further comprising a lid for the perforated inner bowl.

4. The apparatus of claim 1 in combination with the food processor base, wherein vibration dampeners are positioned on the food processor base.

5. A kit containing the apparatus of claim 1 and one or more removable bases for the outer bowl, the removable bases being sized to fit different sized seats of food processor bases.

6. The apparatus of claim 1, wherein the perforated inner bowl comprises an insert extending from the bottom of the perforated inner bowl, and the outer bowl comprises an insert receptacle for receiving the insert.

7. The apparatus of claim 1, wherein a shaft extension connects the drive shaft to the perforated inner bowl.

8. The apparatus of claim 2 in which the speed retarder comprises a removable lip placed between the perforated inner bowl and the outer bowl.

9. The apparatus of claim 1, wherein the outer bowl comprises a drain for draining fluid within the outer bowl.

10. The apparatus of claim 9, further comprising a filter for filtering fluid being drained through the drain in the outer bowl.

11. The apparatus of claim 1 in combination with the food processing base, the food processor base including the drive shaft and the motor, the drive shaft being rotatable by the motor; the outer bowl being seated on the seat; and a speed retarder disposed between the perforated inner bowl and the outer bowl to regulate the speed of the perforated inner bowl.

12. The apparatus of claim 11, further comprising a lid for the perforated inner bowl.

13. The apparatus of claim 11, wherein vibration dampeners are positioned on the food processor base.

14. The apparatus of claim 11, wherein the perforated inner bowl comprises an insert extending from the bottom of the inner bowl, and the outer bowl comprises an insert receptacle for receiving the insert.

15. The apparatus of claim 11, wherein a shaft extension connects the drive shaft to the inner perforated bowl.

16. The apparatus of claim 11 in which the speed retarder comprises a removable lip placed between the perforated inner bowl and the outer bowl.

17. The apparatus of claim 11, wherein the outer bowl comprises a drain for draining fluid within the outer bowl.

18. The apparatus of claim 17, further comprising a filter for filtering fluid being drained through the drain in the outer bowl.

19. The apparatus of claim 2 in which the speed retarder comprises centering wheels attached to a centering ring for centering the perforated inner bowl within the outer bowl, the centering ring fitting between the perforated inner bowl and the outer bowl.

20. The apparatus of claim 11 in which the speed retarder comprises centering wheels attached to a centering ring for centering the perforated inner bowl within the outer bowl, the centering ring fitting between the perforated inner bowl and the outer bowl.

21. The apparatus of claim 2 in which the speed retarder comprises centering wheels attached to the outer lid for centering the perforated inner bowl within the outer bowl, the centering wheels fitting between the perforated inner bowl and the outer bowl.

22. The apparatus of claim 11 in which the speed retarder comprises centering wheels attached to the outer lid for centering the perforated inner bowl within the outer bowl, the centering wheels fitting between the perforated inner bowl and the outer bowl.

* * * * *